United States Patent [19]

Sweet

[11] 4,427,801

[45] Jan. 24, 1984

[54] EXTRUDABLE SILICONE ELASTOMER COMPOSITIONS

[75] Inventor: Randall P. Sweet, Midland, Mich.

[73] Assignee: Dow Corning Corporation, Midland, Mich.

[21] Appl. No.: 500,012

[22] Filed: Jun. 3, 1983

Related U.S. Application Data

[63] Continuation of Ser. No. 368,331, Apr. 14, 1982, abandoned.

[51] Int. Cl.$^3$ .............................................. C08L 83/04
[52] U.S. Cl. .................................... 523/212; 524/862; 524/906
[58] Field of Search ................. 524/862, 906; 523/212

[56] References Cited

U.S. PATENT DOCUMENTS

| | | | |
|---|---|---|---|
| 3,122,516 | 2/1969 | Polmanteer | 260/37 |
| 3,697,473 | 10/1972 | Polmanteer et al. | 260/37 SB |
| 3,699,073 | 10/1972 | Wada et al. | 260/37 SB |
| 3,884,866 | 5/1975 | Jeram et al. | 260/32.8 |
| 4,077,943 | 3/1978 | Sato et al. | 260/46.5 |
| 4,123,604 | 10/1978 | Sandford | 528/31 |
| 4,162,243 | 7/1979 | Lee et al. | 260/37 |
| 4,163,081 | 7/1979 | Schulz | 428/429 |
| 4,329,274 | 5/1982 | Faltynek | 524/862 |

*Primary Examiner*—Lewis T. Jacobs
*Attorney, Agent, or Firm*—Robert Spector

[57] ABSTRACT

This invention provides organopolysiloxane elastomers exhibiting a desirable combination of high durometer hardness, tensile strength and tear strength, and a level of heat stability sufficient to retain these properties following prolonged exposure to temperatures above 150° C. The elastomers are prepared by curing a vinyl endblocked polydiorganosiloxane, an organopolysiloxane resin having a specified concentration of vinyl groups, a treated silica filler containing vinylsiloxy groups bonded to the silica particles and a organohydrogenpolysiloxane in the presence of a suitable platinum catalyst.

20 Claims, No Drawings

EXTRUDABLE SILICONE ELASTOMER COMPOSITIONS

This application is a continuation, of application Ser. No. 368,331, filed Apr. 14, 1982, now abandoned.

BACKGROUND OF THE INVENTION

1. Field of the Invention

This invention relates to organopolysiloxane compositions. More particularly, this invention relates to the use of extrudable compositions to prepare silicone elastomers exhibiting a desirable combination of high durometer hardness, tensile strength and tear strength following exposure to temperatures above 150° C. for extended periods of time.

2. Description of the Prior Art

Silicone elastomers, a term which includes elastomeric organopolysiloxanes, can be prepared using a variety of organosiloxane oligomers and polymers, fillers and curing mechanisms. The choice of a particular combination of organosiloxane, filler, curing agent and reaction conditions is governed at least in part, by the physical properties desired in the cured elastomer.

The formulations employed to prepare elastomeric organopolysiloxanes range in viscosity from pourable liquids to non-flowable gums which can be processed only under the high level of shear achieved using a two- or three-roll rubber mill.

The prior art discloses elastomeric polyorganosiloxanes exhibiting various combinations of properties desired for particular end use applications, however elastomers exhibiting certain desirable combinations of properties, such as high values of hardness and tear strength that are not adversely affected by heat, have not heretofore been described. The present invention concerns elastomeric polyorganosiloxanes exhibiting such a desirable combination of properties and extrudable formulations for preparing these products.

A polyorganosiloxane composition that is curable by peroxides to yield elastomers exhibiting a high level of tensile strength at elevated temperatures is disclosed in U.S. Pat. No. 3,122,516 to Polmanteer. The desired property is achieved using a reinforcing silica filler containing certain vinyl substituted silyl units in combination with other non-vinyl containing silyl units. Specified concentrations of these units are attached through siloxane linkages to the silicon atoms on the surface of the filler particles. The modified silica filler defined by Polmanteer contains 50 to 100 mol percent $SiO_2$ units (W) and 0 to 50 mol percent $RSiO_{1.5}$ units (X). The surfaces of the filler particles are saturated with

units (Y) and

units (Z) where there are 4 to 29.9 (Y) units and 0.1 to 2 (Z) units per 100 (W) and (X) units and a total of 6 to 30 (Y) and (Z) units per 100 (W) and (X) units. In the foregoing formula, n has an average value from 2 to 3 and the average value of x is from 1 to 2. Polmanteer further suggests that the best results are obtained using organopolysiloxanes having 99 to 99.5 inclusive mol percent dimethylsiloxane units and 0.05 to 1 inclusive mol percent methylvinylsiloxane units. From 20 to 100 parts of filler per 100 parts of polysiloxane gum must be used to achieve the improved hot strength, where the viscosity of the polymer and the desired amount of filler are in an inverse ratio to each other. However, Polmanteer does not suggest compositions of this invention which are readily extrudable and cure to yield elastomers exhibiting high tear strength and high durometer hardness following exposure to temperatures above 150° C. for extended periods of time.

Polmanteer et al. in U.S. Pat. No. 3,697,473 describe a composition which is flowable at ambient temperature. The composition consists essentially of (1) a polydiorganosiloxane having a vinyl group in each of the two terminal triorganosiloxy groups, and (2) a mixture of silicon compounds containing silicon-bonded hydrogen atoms, one compound containing two silicon-bonded hydrogen atoms per molecule and another compound containing 3 to 10 silicon-bonded hydrogen atoms per molecule. The composition is cured using a platinum catalyst and, optionally, a reinforcing silica. The compositions described by Polmanteer et al. are fluid and the cured elastomers have high tensile strengths and elongations. Such compositions may be useful for many applications, but do not achieve the combination of high durometer hardness with high tensile and tear strengths required for certain applications.

In U.S. Pat. No. 3,884,866, Jeram et al. describe an organopolysiloxane composition suitable for low pressure injection molding. The composition yields elastomers having high tensile strength, good elongation but relatively low tear strength. These compositions described by Jeram et al. comprise 20 to 90 parts of a vinyl-containing organopolysiloxane having a viscosity of 5,000 to 1,000,000 centipoises, 5 to 40 parts of a vinyl-containing organopolysiloxane having a viscosity of 50 to 5,000 centipoise, 5 to 70 parts of filler and 0.1 to 50 parts per million of a platinum catalyst. This composition is cured by mixing 100 parts of it with 1 to 100 parts of a composition containing silicon-bonded hydrogen atoms. These Jeram et al. compositions appear to buffer the same problems encountered with other prior art compositions. Jeram et al. teach that higher durometer hardness values can be achieved by increasing the concentration of a treated silica filler, however the additional filler increases the viscosity of the composition, making it more difficult to process.

U.S. Pat. No. 4,162,243 to Lee, Maxson and Stebleton (hereinafter referred to as Lee) teaches using a liquid vinyl endblocked polydimethylsiloxane fluid wherein the molecular weight distributions of the various polymer species that constitute the fluid are within specified ranges. Formulations containing these fluids are extrudable under relatively low pressures and can be cured to elastomers exhibiting durometer hardness values of up to 65 on the Shore A scale in combination with a tensile strength of 6.97 megapascals and a tear strength of 35.0 kilonewtons per meter. While these property levels may be adequate for certain end use applications, other applications require even higher levels of durometer hardness and tear strength following exposure of the elastomer to temperatures above 150° C. for extended periods of time. While certain of the control formulations employed by Lee for comparative purposes exhibit durometer hardness values as high as 68, the tear strength of these products is only 5.08 kilonewtons per meter, compared with 35.0 kilonewtons per meter for elastomers prepared in accordance with the teaching of Lee.

It has now been found that the levels of durometer hardness and tear strength achieved using the type of polyorganosiloxane formulations disclosed by Lee can be substantially increased by introducing into these formulations from 20 to about 30% by weight, based on the weight of vinyl endblocked polydimethylsiloxanes, of certain vinyl-containing polysiloxane resins.

Polyorganosiloxane elastomer formulations employing a polyorganosiloxane resin containing vinyl groups are disclosed in U.S. Pat. No. 4,163,081, which teaches that the resins can be optionally added to improve the adhesion of polyorganosiloxanes, particularly elastomers, to substrates such as glass, aluminum and stainless steel.

U.S. Pat. No. 4,123,604 teaches employing vinyl-containing resinous copolymers containing $R_3SiO_{1/2}$, $R_2(CH_2=CH)SiO_{1/2}$ and $SiO_{4/2}$ units in combination with specified rhodium catalysts and a polydiorganosiloxane to obtain a coating material exhibiting a desirable range of release values when applied to a paper substrate. It would not be obvious from the disclosures in this patent to add a carefully controlled amount of a vinyl-containing organopolysiloxane resin to an elastomer formulation containing a vinyl endblocked polydiorganosiloxane and a silica filler containing a specified concentration of vinyl groups on the surface of the silica particles with the objective of increasing the durometer hardness of the final elastomer without adversely affecting other properties such as tensile strength, elongation and tear strength.

The optional use of certain vinyl-containing organopolysiloxane resins to improve the mechanical strength of elastomeric organopolysiloxanes is suggested in U.S. Pat. No. 4,077,943, however this reference does not specify which properties can be improved or the advantages achieved by combining the vinyl-containing resin with a silica filler containing a small concentration of vinyl groups bonded to the surface of the silica particles.

U.S. Pat. No. 3,699,073 to Wada et al. discloses organopolysiloxane elastomers prepared from liquid compositions containing a vinyl endblocked polydiorganosiloxane, an optional organopolysiloxane resin containing $SiO_{4/2}$, $R_3SiO_{1/2}$ and $CH_2=CH(R_2)SiO_{1/2}$ groups, a relatively low molecular weight organosiloxane copolymer containing chain terminating groups of the formula $R''R_2SiO_{1/2}$, $R_2(R'O)SiO_{1/2}$ or $R_2(HO)SiO_{1/2}$ and an inorganic filler. The disclosure of Wada et al. is sufficiently broad to encompass all but one of the classes of ingredients present in the formulations employed in the method of the present invention, however this disclosure also encompases formulations that will not yield elastomers exhibiting the unique combination of heat stability, high durometer hardness, high tensile strength and high tear strength which distinguishes the products of the present invention from prior art materials, including those exemplified in the aforementioned Wada et al. patent. Nowhere in this patent is there any teaching concerning (1) a requirement for a critical selection of specific types and relative amounts of ingredients from the broad ranges disclosed in the patent or (2) the unique combination of desirable properties that can be achieved by adhering to such a requirement.

SUMMARY OF THE INVENTION

This invention provides organopolysiloxane elastomers exhibiting a desirable combination of high durometer hardness, tensile strength and tear strength, and a level of heat stability sufficient to retain these properties following prolonged exposure to temperatures above 150° C. The elastomers are prepared by reacting a vinyl endblocked polydiorganosiloxane, an organopolysiloxane resin having a specified concentration of vinyl groups, a treated silica filler containing vinylsiloxy groups bonded to the silica particles and a organohydrogenpolysiloxane in the presence of a suitable platinum catalyst.

DETAILED DESCRIPTION OF THE INVENTION

This invention provides an elastomeric organopolysiloxane obtained by curing an extrudable, curable composition consisting essentially of (1) 100 parts by weight of a liquid triorganosiloxy endblocked polydiorganosiloxane exhibiting a viscosity of from 5,000 to 200,000 centipoises at 25° C., wherein the triorganosiloxy groups are vinyldimethylsiloxy or vinylmethylphenylsiloxy and at least 95% of the diorganosiloxane groups are dimethylsiloxane;

(2) from 20 to 60 parts by weight of finely divided amorphous silica particles having a surface area greater than 100 square meters per gram, wherein at least a portion of the silicon atoms on the surface of the particles are bonded to trimethylsiloxy groups and vinyl-containing siloxy groups selected from the group consisting of
  (a) $CH_2=CH(CH_3)_2SiO[(CH_3)_2SiO]_x$
  (b) $CH_2=CH(CH_3)(C_6H_5)SiO[(CH_3)_2SiO]_x$
  where the average value of x if from 0 to 20, and
  (c) organosiloxy groups consisting essentially of repeating units of the general formulae

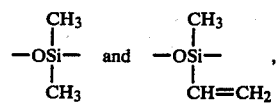

the total number of repeating units in each organosiloxy group being from 2 to about 20, and the molar ratio of dimethylsiloxy units to methylvinylsiloxy units having an average value of from 1:1 to 5:1, the relative concentrations of trimethylsiloxy and vinyl-containing siloxy groups being sufficient to provide (1) from 0.01 to 0.5 percent of vinyl groups, based on the weight of silica, and (2) from 1 to 100 moles of trimethylsiloxy groups for each mole of vinyl-containing siloxy groups;

(3) from 10 to 50 parts of an organopolysiloxane resin consisting essentially of
  (d) $R_2^1(CH_2=CH)SiO_{0.5}$ units,
  (e) $R_3^2SiO_{0.5}$ units and
  (f) $SiO_{4/2}$ units wherein the molar ratio of the combination of (d) and (e) units to (f) units is from 0.6 to 1.1, the concentration of (d) units is from 2 to 8% based on the weight of said organopolysiloxane resin, and $R^1$ and $R^2$ are alkyl containing from 1 to 4 carbon atoms or phenyl, with the proviso that at least 95% of the $R^1$ and $R^2$ groups are methyl;

(4) a liquid organohydrogensiloxane in an amount sufficient to provide from 1 to 3 silicon-bonded hydrogen atoms per vinyl group present in components (1), (2) and (3) combined, said organohydrogensiloxane having an average of at least three silicon-bonded hydrogen atoms per molecule and consisting essentially of units selected from the group consisting of methylhydrogensiloxy, dimethylsiloxy, dimethylhydrogensiloxy, trimethylsiloxy and $SiO_{4/2}$ units; and (5) a platinum-containing catalyst in sufficient amount to provide at least 0.1 parts by weight of platinum per million parts by weight of said triorganosiloxy endblocked polydiorganosiloxane. This invention also provides extrudable, curable compositions as defined hereinabove.

A. The Triorganosiloxy Endblocked Polydiorganosiloxane

Liquid triorganosiloxy endblocked polyorganosiloxanes having a wide range of molecular weights are well known materials. For the purpose of the invention, the triorganosiloxy group can be dimethylvinylsiloxy or methylphenylvinylsiloxy. Liquid triorganosiloxy endblocked polyorganosiloxanes (hereinafter referred to as component A) that are suitable for use in preparing the elastomeric organopolysiloxanes of this invention exhibit viscosities from 5,000 to 200,000 centipoises, measured at a temperature of 25° C. Component A can be represented by the formula

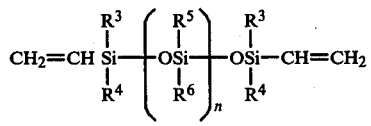

where $R^3$ is methyl, $R^4$ is methyl or phenyl and $R^5$ and $R^6$ are individually methyl, ethyl, propyl or phenyl. At least 95%, preferably 100%, of the $R^5$ and $R^6$ groups are methyl. Component A may also contain trace amounts of $R_3^4SiO_{1/2}$, $R^3SiO_{3/2}$ and $SiO_{4/2}$, all of which are by-products produced during the preparation of the component A.

The value of n in the foregoing formula is such that component A exhibits a viscosity of from 5,000 to 200,000 centipoises, preferably from 35,000 to 75,000 centipoises, measured at 25° C. Depending upon the identity of the $R^5$ and $R^6$ groups, n will have an average value of from 650 to about 1000.

Component A can be a single polysiloxane prepared using any of the known methods for preparing vinyl endblocked polyorganosiloxanes. Alternatively, component A may be a mixture of two or more separately prepared polymers of similar or different average molecular weights. If mixtures of vinyl endblocked polyorganosiloxanes are employed, these mixtures should be within the limits for molecular weight and dispersity index disclosed in U.S. Pat. No. 4,162,243, which is hereby incorporated in its entirety by reference. This patent discloses mixtures of polyorganosiloxanes which collectively provide a molecular weight distribution such that there is present at least one polymeric species (1) at a concentration greater than the concentrations of polymeric species of lower and higher molecular weight. Polymeric species (1) is described as having a peak molecular weight, determined by gel permeation chromatography in the range of from 68,000 to 135,000. The molecular weight of the lowest molecular weight polymeric species is in the range of from 854 to 3146 and the molecular weight of the highest molecular weight species is in the range of from 174,000 to 370,000. The mixture of the various polymeric species present have a molecular weight distribution such that the dispersity index of the composition has a value greater than 3.8.

B. The Treating Silica Particles

The silica particles (component B) of the present organopolysiloxane compositions can be any of the commercially available types of finely divided amorphous silica having surface areas of at least 100 square meters per gram, preferably from 120 to 600 square meters per gram. The silicon atoms on the surface of the particles are bonded to trimethylsiloxy groups, $(CH_3)_3SiO—$, and vinyl-containing siloxy groups of the formula (a) $CH_2\!=\!CH(CH_3)_2SiO[(CH_3)_2SiO]_x\!—$, (b) $CH_2\!=\!CH(CH_3)(C_6H_5)SiO[(CH_3)_2SiO]_x\!—$ where x is an integer from 0 to 20 and/or (c) siloxy groups consisting essentially of the repeating units

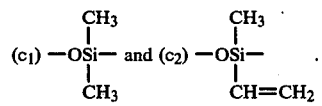

Each siloxy group of this type contains from 2 to about 20 repeating units and the molar ratio of dimethylsiloxy to methylvinylsiloxy units if from 1:1 to about 5:1, preferably from about 1:1 to 2:1.

The treated silica particles contain from 0.01 to 0.5 percent, preferably 0.1 to 0.5 percent by weight of vinyl groups and the molar ratio of the various siloxy groups bonded to the silica is such that from 1 to 100 moles of trimethylsiloxy groups are present for each mole of vinyl-containing siloxy group. The vinyl-containing siloxy group is preferably the one represented by formula (a) above wherein x is from 0 to 5, or the one containing repeating units $(c_1)$ and $(c_2)$.

The concentration of the treated silica particles is from 20 to 60 parts by weight per 100 parts of component A, preferably from 30 to 40 parts.

The silica can be of the types conventionally referred to as "fumed" and "precipitated". Treatment of the silica to bond the aforementioned siloxy groups to the surface of the silica particles can be carried out by reacting the silica with organosiloxanes and/or hexaorganodisilazanes and then combining the treated silica with component A, or the silica can be treated in the presence of component A. Such treating methods are widely known in the art, and are applicable in this invention to prepare the treated silicas if the proper organosiloxane groups are present in the molar ratios defined herein. The treating compounds can include, for example, hexamethyldisilazane for trimethylsilyl groups, symmetrical-tetramethyldivinyldisilazane and $[CH_2\!=\!CH(CH_3)_2SiO[(CH_3)_2SiO]_3]_2NH$ for organosilosiloxy groups corresponding to formula (a) above, symmetrical-dimethyldiphenyldivinyldisilazane for organosiloxy groups of formula (b) and hydroxyl endblocked polydiorganosiloxanes having one methylvinylsiloxane unit for every one to five dimethylsiloxane units to obtain organosiloxy groups having repeating units corresponding to formulae $(c_1)$ and $(c_2)$. A preferred polyorganosiloxane contains an average of one methylvinylsiloxane unit for every 1.5 to 2 dimethylsiloxane units.

Various methods for treating silica are disclosed in U.S. Pat. No. 4,173,560, entitled "TREATMENT OF REINFORCING SILICAS WITH AMIDOSILOXANES." This patent is hereby incorporated in its entirety by reference to show the amidosiloxanes, the treated silicas and the methods of preparing treated silica. The treatment of silica using bis(polyorganosiloxanyl)amines is disclosed in U.S. Pat. No. 4,152,315, entitled "BIS(POLYORGANOSILOXANYL)AMINES AND THEIR USE". This patent is hereby incorporated in its entirety by reference to show the amines, the treated silica and the method of making the treated silica.

C. The Organopolysiloxane Resin

The organopolysiloxane resin (component C) is indispensible to achieving the combination of desirable physical properties that distinguishes the elastomers of the present invention from prior art materials. These resins are copolymers containing the units (d) $R_2^1(CH_2=CH)-SiO_{0.5}$, (e) $R_3^2SiO_{0.5}$ and (f) $SiO_{4/2}$ where $R^1$ and $R^2$ are lower alkyl containing from 1 to 4 carbon atoms or phenyl, with the proviso that at least 95% of $R^1$ and $R^2$ are methyl. Most preferably all the $R^1$ and $R^2$ groups are methyl. The molar ratio of the combined (d) and (e) units to (f) units is from 0.6:1 to 1.1:1. Units represented by formula (d) constitutes from 2 to 8% by weight of the resin and the resin preferably contains at least two vinyl groups per molecule of copolymer. In a preferred species of organopolysiloxane resin, the ranges for the ratio of (d) to (e) to (f) units is 5–10:40–45:45–50, with the proviso that the concentration of (d) units does not exceed about 8%, based on resin weight.

Resinous copolymers containing the aforementioned (d), (e) and (f) units can be prepared as described in U.S. Pat. No. 2,676,182, issued to Daudt and Tyler, which is hereby incorporated in its entirety by reference. The copolymers described in this patent contain from 2 to 3 percent by weight of hydroxyl groups, which is considerably above the maximum level of 0.3 weight percent desired for the resinous copolymer component of the present invention. The hydroxyl content of the resin is conveniently reduced to the desired level by employing a higher concentration of triorganosiloxane capping agent, or a precursor thereof, than the concentration range taught in the aforementioned U.S. Pat. No. 2,676,182. Briefly, this method comprises reacting under acidic conditions a silica hydrosol with organosubstituted siloxanes, such as hexamethyldisiloxane, or hydrolyzable triorganosilanes such as trimethylchlorosilane. To prepare the resins of this invention, the desired amount of the appropriate vinyl-containing silazane, siloxane or silane would also be present in the reaction mixture.

The concentration of organosiloxane resin in the curable compositions of this invention is critical to achieving the desired properties following curing of a liquid, extrudable precursor. Less than about 10%, based on the weight of component A, will not yield any significant improvement in durometer hardness and tear strength of the final cured elastomer, while more than about 50% by weight will increase the viscosity of the curable composition to the extent that it cannot be extruded under conventional conditions of temperature and pressure.

The viscosity of the present curable compositions is a function of at least three parameters, namely the viscosity of the vinyl endblocked polyorganosiloxane (component A), the concentration of silica and the concentration of organopolysiloxane resin. Using the ranges for component A viscosity (5,000 to 200,000 centipoises at 25° C.) and silica content (20 to 60%, based on the weight of component A) specified for the organopolysiloxane compositions of this invention, the optimum concentration range of organopolysiloxane resin appears to be from about 15 to about 30% based on the weight of component A.

It will be understood that as the viscosity of component A and/or the silica content increase, it may be necessary to reduce the concentration of polysiloxane resin to achieve a processable composition. Alternatively, the silica content and/or the viscosity of component A can be reduced if it is desired to employ more than about 30% of resin, based on the weight of component A. Adjusting the concentrations of the various components in a organopolysiloxane composition to achieve the desired balance between viscosity of the precursor and physical properties of the final cured product is a conventional procedure and can be accomplished with a minimum of experimentation by those skilled in this art.

D. The Liquid Organohydrogensiloxane

Organosiloxanes containing at least three silicon-bonded hydrogen atoms per molecule are well known in the art, and are described in numerous publications including U.S. Pat. Nos. 3,697,473 to Polmanteer et al. and in U.S. Pat. No. 3,989,473 to Lee et al., which patents are hereby incorporated by reference.

The organohydrogensiloxanes useful in the present invention can be any of the known methylsiloxanes having an average of at least 3, preferably at least 4, silicon-bonded hydrogen atoms per molecule and an average of no more than one silicon-bonded hydrogen atom per silicon atom. The remaining valences of the silicon atoms are satisfied by methyl groups and divalent oxygen atoms. The organohydrogensiloxanes can be homopolymers, copolymers, or mixtures thereof. Suitable organohydrogensiloxanes contain methylhydrogensiloxane units, dimethylhydrogensiloxy units, and may also contain dimethylsiloxy, trimethylsiloxy and $SiO_2$ units. Some specific examples of representative organohydrogensiloxanes include cyclic polymethylhydrogensiloxanes, copolymers containing trimethylsiloxy and methylhydrogensiloxane units, copolymers of trimethylsiloxy, dimethylsiloxane, and methylhydrogensiloxane units and copolymers of dimethylhydrogensiloxy, dimethylsiloxane, and methylhydrogensiloxane units. The amount of organohydrogensiloxane present in a curable organopolysiloxane composition is sufficient to provide from 1 to 3 silicon-bonded hydrogen atoms per vinyl group present in the curable organopolysiloxane composition. The components of this composition which contain vinyl groups include the vinyl terminated polydiorganosiloxane, the treated silica filler and the organopolysiloxane resin.

It should be understood that in order to be effective, the organohydrogensiloxane must be compatible with, and preferably soluble in, the compositions of this invention. "Compatible" implies that the required concentration of organohydrogensiloxane is at least partially soluble in the and will remain in a uniformly dispersed state in a curable composition of this invention until the curing reaction is substantially complete.

E. The Platinum Catalyst

The materials identified heretofore as components A, B, C and D will react in the presence of a suitable platinum-containing catalyst to yield an elastomeric product. The catalyst can be any of the platinum compositions that are known to catalyze the reaction between silicon bonded hydrogen atoms and olefinic double bonds, such as are present in silicon bonded vinyl groups, and that are soluble in component A. A particularly suitable class of platinum-containing catalysts are the complexes prepared from chloroplatinic acid and certain unsaturated organosilicon compounds and described by Willing in U.S. Pat. No. 3,419,593 which is hereby incorporated by reference to show these complexes and their preparation. One preferred catalyst of this type is a reaction product of chloroplatinic acid and sym-divinyltetramethyldisiloxane.

The platinum catalyst (component E) can be present in an amount sufficient to provide at least one part by weight of platinum for every one million parts by weight of component A. It is preferred to use sufficient catalyst so that there is present from 5 to 50 parts by weight platinum for every one million parts by weight of component A. It is to be understood that amounts of platinum greater than 50 parts per million are also effective but are unnecessary and wasteful, especially when the preferred catalyst is used.

Since mixtures containing components A, C and D with the catalyst (component E) may begin to cure immediately on mixing at room temperature, it may be desirable to inhibit the action of the catalyst at room temperature with a suitable inhibitor if the composition is to be stored before molding. Platinum catalyst inhibitors are used to retard the catalytic activity of the platinum at room temperature, but allow the platinum to catalyze the reaction between components A, C and D at elevated temperature.

One suitable type of platinum catalyst inhibitor is described in U.S. Pat. No. 3,445,420 to Kookootsedes et al. which is hereby incorporated by reference to show certain acetylenic inhibitors and their use. A preferred class of acetylenic inhibitors are the acetylenic alcohols, especially 2-methyl-3-butyn-2-ol.

A second type of platinum catalyst inhibitor is described in U.S. Pat. No. 3,989,667 to Lee and Marko which is hereby incorporated by reference to show certain olefinic siloxanes, their preparation and their use as platinum catalyst inhibitors.

A third type of platinum catalyst inhibitor is a polymethylvinylcyclosiloxane having three to six methylvinylsiloxane units per molecule.

The optimum concentration of platinum catalyst inhibitor is that which will provide the desired storage stability at ambient temperature without excessively prolonging the time interval required to cure the compositions at elevated temperatures. This amount will vary widely and will depend upon the particular inhibitor that is used, the nature and concentration of the platinum-containing catalyst and the nature of the organohydrogensiloxane (component D).

Inhibitor concentrations as low as one mole of inhibitor per mole of platinum will in some instances yield a satisfactory level of storage stability and desirable curing period. In other cases, inhibitor concentrations of up to 10, 50, 100, 500 or more moles per mole of platinum may be needed. The optimum concentration for a particular inhibitor in a given composition can be determined by routine experimentation. Inhibited compositions are cured by heating them to a temperature of 70° C. or higher.

The compositions employed to prepare the elastomeric organopolysiloxanes of this invention can also contain conventional additives, including pigments, extending fillers and heat stabilizers.

The organopolysiloxane elastomers of this invention can be formed using an injection molding process during which the precursor composition is injected into light weight molds under low pressures, such as 600 kPa cylinder pressure. Such compositions cure very rapidly in a hot mold and can be removed without cooling the mold. The types of molding, extruding and curing processes used are not narrowly critical and can include those known in the art. The viscosity of the precursor compositions is such that they can be extruded through a 3.175 millimeter orifice at a rate of from 20 to 50 grams per minute under a pressure of 620 kilopascals.

The silicone elastomeric compositions of this invention can readily be prepared using conventional dough type mixing equipment such as Baker Perkins mixers. The order of addition of the various components is not critical if the composition is to be used immediately, however it has been found preferable to combine components A, B, C and E, and thereafter add component D. This permits the small amount of catalyst (component E) to become well dispersed in components A, B, and C prior to the beginning of any curing reaction. Suitable two package compositions can be made using such a technique. For example, a convenient two package composition can be prepared by mixing part of A, part of B, part of C and all of E in one package and the remainder of A, B, C and all of D in a second package such that equal weight amounts of package one and package two can be mixed to produce the compositions of this invention. Single package compositions can be prepared by mixing A, B, C, D and E and a platinum catalyst inhibitor. These inhibited compositions can be stored for extended periods of time under ambient conditions without curing, but will still cure when heated above 70° C., preferably above 100° C. to shorten the cure time.

It is advised that a mixture of A, C, D and E will immediately begin to cure at room temperature if no inhibitor is present. This should be taken into account when preparing and using compositions of this invention. Although the silicone elastomeric compositions of this invention will cure at room temperature, it is best to use inhibited compositions for molding or extruding processes to avoid scorching during material transfer, especially where the composition may come in contact with warm surfaces.

The combination of (1) a vinyl-containing polydiorganosiloxane, (2) a finely divided silica containing vinyl groups bonded to the surface of the particles, and (3) a vinyl-containing organopolysiloxane resin in which combination the concentrations of vinyl groups in the resin and on the silica are within specified limits, is responsible for the unique combination of heat stability, high durometer hardness (shore A values of 65 and above), high tensile strength (above 8 megapascals) and high tear strength (above about 40 kilonewtons per meter) that distinguish preferred embodiments of the cured elastomers prepared in accordance with the method of this invention from elastomers prepared using prior art polysiloxane compositions such as those disclosed in the aforementioned U.S. Pat. Nos.

4,162,243 to Lee, Maxson and Stebleton and 3,6799,073 to Wada et al. Such property profiles are not typical of elastomers prepared ferom extrudable compositions.

An additional advantage of the present compositions is that the desirable physical properties exhibited by the cured elastomers are retained following post-curing at temperatures of from 150° to 200° C. for up to eight hours. Under these conditions the physical properties of many prior art elastomers, particularly tear strength, undergo substantial deterioration.

The following examples are presented for illustrative purposes and should not be construed as limiting the invention which is encompassed by the accompanying claims. All parts and percentages in the examples are by weight unless otherwise specified.

EXAMPLE 1

This example demonstrates the superior heat stability, durometer hardness and tear strength exhibited by elastomers prepared in accordance with the method of this invention.

The formulations described in this example were prepared by blending in a dough type mixer 4 parts by weight of water, from 0 to 2.34 parts of vinyl-containing silica treating agent, and 80.5 parts of a mixture (composition A) containing (1) 81.1% by weight of a dimethylvinyl terminated polydimethylsiloxane having a viscosity of from 45,000 to 65,000 centistokes at 25° C., measured in accordance with ASTM test method D-1084, and (2) 18.9% by weight of an organopolysiloxane resin containing 0.8 molar part trimethylsiloxane units, 1 molar part $SiO_{4/2}$ units and 0.09 molar part of $(CH_3)_2CH_2=CH-SiO_{1/2}$ units. The hydroxyl content of the resin is about 0.1% by weight and the resin contains about 6.5% by weight of $(CH_3)_2CH_2=CHSiO_{1/2}$ units.

The vinyl-containing silica treating agent was a hydroxyl-terminated diorganopolysiloxane having a viscosity of about 40 centistokes at 25° C. and containing dimethylsiloxy and methylvinylsiloxy units in a molar ratio of about 1.8 to 1. The resultant mixture of composition A, water and vinyl-containing silica treating agent was combined with 16 parts of hexamethyl disilazane; followed by the gradual addition of 70 parts of a fumed silica having a surface area of about 400 square meters per gram. The weight ratio of composition A to silica was about 1.15 to 1.

During the mixing cycle it is believed that the vinyl-containing silica treating agent and the hexamethyldisilazane reacted with hydroxyl groups present on the surface of the silica to form dimethylsiloxy, methylvinylsiloxy and trimethylsiloxy groups.

Following completion of the silica addition the resultant mixture was blended at a temperature of 150° C. and sub-atmospheric pressure until the evolution of volatile materials was no longer apparent. At the end of this time period, 119.5 parts of composition A were added and mixing was continued until a homogeneous material was obtained. The resultant product was then cooled to ambient temperature and combined with 8.7 parts of a trimethylsiloxy terminated polymethylhydrogensiloxane fluid having a viscosity of about 30 centistokes at 25° C., 0.5 part of a chloroplatinic acid complex of symmetrical tetramethyldivinyldisiloxane diluted with sufficient methylphenylvinylsiloxy terminated polydimethylsiloxane to provide a platinum content of 0.7% by weight 1 part of a hydroxyl-terminated polydimethylsiloxane having a viscosity of about 40 centistokes at 25° C. and 0.05 part of 2-methyl-3-butyn-2-ol as a catalyst inhibitor.

The amount of vinyl-containing silica treating agent was varied from 0 to 2.34 parts. The final formulations were pressed into sheets and cured under the conditions specified in the following Table I. The physical properties of the resulting cured sheets were determined using the following ASTM (American Association for Testing of Materials) test methods:

ASTM D-412 for tensile strength and elongation
ASTM D-624 die B for tear strength
ASTM D-2240 for durometer hardness.

The results of the foregoing tests are reported in the following Table I. Tensile strength values are reported in megapascals (MPa) and tear strength values are reported in kilonewtons per meter (kN/m).

The composition of the final formulation can be expressed as follows:

| | |
|---|---|
| Dimethylvinyl terminated polysiloxane | 100 parts |
| Silica | 35 parts |
| Organopolysiloxane resin | 34.2 parts |
| Organohydrogen siloxane | equivalent to 1.6 silicon-bonded hydrogen atoms per vinyl group |
| Platinum catalyst | equivalent to 23 parts by weight per million of dimethylvinyl terminated polysiloxane |
| Molar ratio of combined trimethylsiloxy and dimethylvinylsiloxy to $SiO_{4/2}$ groups in resin | 0.89 |
| Concentration of vinyl groups on silica | 0.1–0.34 based on silica |
| Number of repeating units per molecule of vinyl-containing silica treating agent | 5.5 (avg. value) |
| Molar ratio of trimethylsiloxy groups to vinyl-containing siloxy groups or silica | 13.2–45.5 |

TABLE I

| Parts of Treating Agent | Curing Conditions | Durometer Hardness (Shore A) | Tensile Strength (MPa) | Tear Strength Die B (kN/m) | Elongation (%) |
|---|---|---|---|---|---|
| 0 (Control) | a | 66 | 7.86 | 48.1 | 670 |
| | b | 70 | 7.03 | 49.9 | 460 |
| 0.29 | a | 65 | 8.89 | 47.8 | 680 |
| | b | 73 | 7.72 | 49.0 | 485 |
| 0.58 | a | 65 | 8.69 | 45.0 | 670 |
| | b | 74 | 7.72 | 53.7 | 460 |
| 1.17 (Control) | a | 68 | 8.14 | 49.9 | 560 |
| | b | 75 | 6.96 | 14.0 | 750 | a = 5 minutes at 150° C.
b = 5 minutes at 150° C. followed by 2 hour postcure at 200° C.
*Parts per 100 parts of composition A The data in the preceding table demonstrate that the optimum combinations of tensile strength, tear strength and durometer hardness were achieved when the silica treating agent was present at a level equivalent to from 0.1 to 0.34% vinyl groups, based on the weight of silica.

EXAMPLE 2

A polysiloxane elastomer precursor was prepared as described in the preceeding example 1. In this instance the concentration of the vinyl-containing silica treating agent was 0.34 part by weight per 100 parts of the dimethylvinyl terminated polydimethylsiloxane component of composition A (equivalent to 0.12% by weight of vinyl groups on silica, based on silica weight) and the concentration of the toluene-soluble organopolysiloxane resin component of composition A was varied from 6.39 to 100 parts per 100 parts of the dimethylvinyl terminated polydimethylsiloxane. The concentrations of the remaining components had the same values specified in example 1, and were based on 100 parts by weight of the mixture of dimethylvinyl terminated polydimethylsiloxane and organopolysiloxane resin.

The samples were pressed into sheets, cured and their physical properties measured as described in example 1. The data are recorded in the following Table II.

TABLE II

| Parts of organopolysiloxane resin (parts/100 parts vinyl-terminated PDMS[1]) | Curing Conditions | Durometer Hardness (Shore A) | Tensile Strength (MPa) | Tear Strength Die B (kN/m) | Elongation % |
|---|---|---|---|---|---|
| 6.39 (control) | a | 17 | 4.69 | 14.71 | 990 |
|  | b | 27 | 6.21 | 22.77 | 920 |
| 13.8 | a | 47 | 9.31 | 33.40 | 740 |
|  | b | 55 | 8.48 | 44.13 | 600 |
| 22.25 | a | 65 | 9.24 | 47.63 | 650 |
|  | b | 73 | 7.52 | 50.79 | 340 |
| 30.7 | a | 69 | 9.24 | 21.89 | 670 |
|  | b | 77 | 7.31 | 15.76 | 340 |
| 100 (control) |  | composition is too viscous for processing | | | |

[1]polydimethylsiloxane
Curing Conditions:
a = 5 minutes at 150° C.
b = 5 minutes at 150° C. followed by 8 hours at 200° C.

If the foregoing values for durometer hardness and tear strength are plotted as a function of resin concentration, it is found that when the resin content is between about 15 and 30%, based on the weight of vinyl-terminated dimethylpolysiloxane, the tear strength is above 40 kilonewtons per meter and the durometer hardness is above 70. This combination of properties has not heretofore been reported for prior art organopolysiloxane elastomers. As the resin content is increased above about 30% the tear strength decreases to a level of 16 kilonewtons per meter during an 8 hour exposure to a temperature of 200° C. A composition containing 50% by weight of the organopolysiloxane resin was too viscous for processing.

That which is claimed is:

1. An elastomeric organopolysiloxane obtained by curing an extrudable, curable composition consisting essentially of
   (1) 100 parts by weight of a liquid triorganosiloxy endblocked polydiorganosiloxane exhibiting a viscosity of from 5,000 to 200,000 centipoises at 25° C., wherein the triorganosiloxy groups are vinyldimethylsiloxy or vinylmethylphenylsiloxy and at least 95% of the diorganosiloxane groups are dimethylsiloxane;
   (2) from 20 to 60 parts by weight of finely divided amorphous silica particles having a surface area greater than 100 square meters per gram, wherein at least a portion of the silicon atoms on the surface of the particles are bonded to trimethylsiloxy groups and vinyl-containing siloxy groups selected from the group consisting of
   (a) $CH_2=CH(CH_3)_2SiO[(CH_3)_2SiO]_x$
   (b) $CH_2=CH(CH_3)(C_6H_5)SiO[(CH_3)_2SiO]_x$
   where the average value of x is from 0 to 20, and
   (c) organosiloxy groups consisting essentially of repeating units of the general formulae

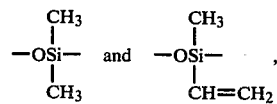

the total number of repeating units in each organosiloxy group being from 2 to about 20, and the molar ratio of dimethylsiloxy units to methylvinylsiloxy units having an average value of from 1:1 to 5:1, the relative concentrations of trimethylsilyl and vinyl-containing siloxy groups being sufficient to provide (1) from 0.01 to 0.5 percent of vinyl groups, based on the weight of silica, and (2) from 1 to 100 moles of trimethylsiloxy groups for each mole of vinyl-containing siloxy groups;
   (3) from 10 to 50 parts of a organopolysiloxane resin consisting essentially of
   (d) $R_2^1(CH_2=CH)-SiO_{0.5}$ units,
   (e) $R_3^2SiO_{0.5}$ units and
   (f) $SiO_{4/2}$ units wherein the molar ratio of the combination of (d) and (e) units to (f) units is from 0.6 to 1.1, and the concentration of (d) units is from 0.2 to 8% based on the weight of said organopolysiloxane resin, and $R^1$ and $R^2$ are alkyl containing from 1 to 4 carbon atoms or phenyl, with the proviso that at least 95% of the $R^1$ and $R^2$ groups are methyl;
   (4) a liquid organohydrogensiloxane in an amount sufficient to provide from 1 to 3 silicon-bonded hydrogen atoms per vinyl group present in components (1), (2) and (3) combined, said organohydrogensiloxane having an average of at least three silicon-bonded hydrogen atoms per molecule and consisting essentially of units selected from the group consisting of methylhydrogensiloxy, dimethylsiloxy, dimethylhydrogensiloxy, trimethylsiloxy and $SiO_{4/2}$ units; and
   (5) a platinum-containing catalyst in sufficient amount to provide at least 0.1 part by weight of platinum per million parts by weight of said triorganosiloxy endblocked polydiorganosiloxane.

2. An elastomeric organopolysiloxane according to claim 1 wherein the triorganosiloxy endblocked polydiorganosiloxane (1) exhibits a viscosity from 35,000 to 75,000 centipoises and is represented by the formula

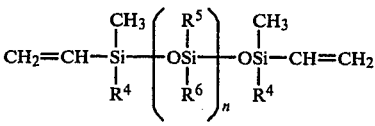

where $R^4$ is methyl or phenyl and $R^5$ and $R^6$ are individually methyl, ethyl, propyl or phenyl, with the proviso that at least 95% of the $R^5$ and $R^6$ groups are methyl and n has an average value from 650 to 1000; the surface area of the silica particles (2) is from 120 to 600 square meters per gram; the silicon atoms on the surface of the silica particles are bonded to organosiloxane groups of the formula $(CH_3)_3SiO-$ and groups consisting essentially of repeating units of the general formulae

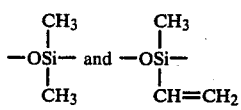

in a molar ratio of from 1:1 to 2:1, respectively; and the concentration of silica particles is from 30 to 40 parts by weight; the organopolysiloxane resin (3) contains at least two vinyl groups per molecule and the molar ratios of (d) units: (e) units: (f) units are within the range 5-10:40-45:45-50, with the proviso that the concentration of (d) units does not exceed about 8%, based on resin weight; the organohydrogen siloxane (4) contains at least 4 silicon-bonded hydrogen atoms per molecule; and the platinum-containing catalyst (5) is a reaction product of chloroplatinic acid and sym-divinyltetramethyl disiloxane.

3. An elastomeric organopolysiloxane according to claim 2 wherein in (1) $R^4$, $R^5$ and $R^6$ are methyl; all of the groups represented by $R^1$ and $R^2$ in the organopolysiloxane resin (3) are methyl; the organohydrogen siloxane (4) is a trimethylsiloxy terminated polymethylhydrogensiloxane; and the concentration of platinum-containing catalyst (5) is equivalent to from 5 to 50 parts by weight Pt per million parts of the triorganosiloxy endblocked polydiorganosiloxane.

4. An elastomeric organopolysiloxane according to claim 3 where the concentration of vinyl groups present in the organosiloxane groups bonded to the silica particles is from 0.05 to 0.5%, based on the weight of sand particles; the organopolysiloxane resin contains 0.8 mole of trimethylsiloxane units and 0.09 mole $(CH_3)_2CH_2=CH-SiO_{0.5}$ units for each mole of $SiO_{4/2}$ units; and the concentration of the organopolysiloxane resin is from 15 to 30 parts by weight.

5. An elastomeric organopolysiloxane according to claim 1 where said extrudable, curable composition contains a platinum catalyst inhibitor in an amount sufficient to inhibit curing of the curable composition at ambient temperature.

6. An elastomeric organopolysiloxane according to claim 5 where said platinum catalyst inhibitor is selected from the group consisting of acetylenic alcohols, olefinic siloxanes and polymethylvinylcyclosiloxanes having three to six methylvinylsiloxane units per molecule.

7. An elastomeric organopolysiloxane according to claim 6 where said platinum catalyst inhibitor is an acetylenic alcohol.

8. An elastomeric organopolysiloxane according to claim 7 where the acetylenic alcohol is 2-methyl-3-butyn-2-ol.

9. An elastomeric organopolysiloxane according to claim 1, 2, 3 or 4 where the organopolysiloxane exhibits a tear strength greater than 40 kilonewtons/meter and a Shore A durometer hardness greater than 65.

10. An elastomeric organopolysiloxane according to claim 1 where the curable composition is post cured at a temperature above 150° C.

11. An extrudable, curable composition consisting essentially of
(1) 100 parts by weight of a liquid triorganosiloxy endblocked polydiorganosiloxane exhibiting a viscosity of from 5,000 to 200,000 centipoises at 25° C., wherein the triorganosiloxy groups are vinyldimethylsiloxy or vinylmethylphenylsiloxy and at least 95% of the diorganosiloxane groups are dimethylsiloxane;
(2) from 20 to 60 parts by weight of finely divided amorphous silica particles having a surface area greater than 100 square meters per gram, wherein at least a portion of the silicon atoms on the surface of the particles are bonded to trimethylsiloxy groups and vinyl-containing siloxy groups selected from the group consisting of
(a) $CH_2=CH(CH_3)_2SiO[(CH_3)_2SiO-_x$
(b) $CH_2=CH(CH_3)$ $(C_6H_5)SiO[(CH_3)_2SiO-_x$
where the average value of x is from 0 to 20, and
(c) organosiloxy groups consisting essentially of repeating units of the general formulae

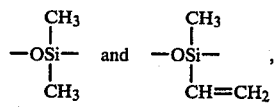

the total number of repeating units in each organosiloxy group being from 2 to about 20, and the molar ratio of dimethylsiloxy units to methylvinylsiloxy units having an average value of from 1:1 to 5:1, the relative concentrations of trimethylsiloxy and vinyl-containing siloxy groups being sufficient to provide (1) from 0.01 to 0.5 percent of vinyl groups, based on the weight of silica, and (2) from 1 to 100 moles of trimethylsiloxy groups for each mole of vinyl-containing siloxy groups;
(3) from 10 to 50 parts of a organopolysiloxane resin consisting essentially of
(d) $R_2^1(CH_2=CH)-SiO_{0.5}$ units,
(e) $R_3^2SiO_{0.5}$ units and
(f) $SiO_{4/2}$ units wherein the molar ratio of the combination of (d) and (e) units to (f) units is from 0.6 to 1.1, and the concentration of (d) units is from 0.2 to 8% based on the weight of said organopolysiloxane resin, and $R^1$ and $R^2$ are alkyl containing from 1 to 4 carbon atoms or phenyl, with the proviso that at least 95% of the $R^1$ and $R^2$ groups are methyl;
(4) a liquid organohydrogensiloxane in an amount sufficient to provide from 1 to 3 silicon-bonded hydrogen atoms per vinyl group present in components (1), (2) and (3) combined, said organohydrogensiloxane having an average of at least three silicon-bonded hydrogen atoms per molecule and consisting essentially of units selected from the group consisting of methylhydrogensiloxy, dimethylsiloxy, dimethylhydrogensiloxy, trimethylsiloxy and $SiO_{4/2}$ units; and (5) a platinum-containing catalyst in sufficient amount to provide at least 0.1 part by weight of platinum per million parts by weight of said triorganosiloxy endblocked polydiorganosiloxane.

12. An extrudable composition according to claim 11 wherein the triorganosiloxy endblocked polydiorganosiloxane (1) exhibits a viscosity from 35,000 to 75,000 centipoises and is represented by the formula

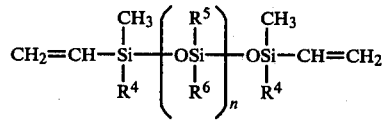

where $R^4$ is methyl or phenyl and $R^5$ and $R^6$ are individually methyl, ethyl, propyl or phenyl, with the proviso that at least 95% of the $R^5$ and $R^6$ groups are methyl and n has an average value from 650 to 1000; the surface area of the silica particles (2) is from 120 to 600 square meters per gram; the silicon atoms on the surface of the silica particles are bonded to organosiloxane groups of the formula $(CH_3)_3SiO$— and groups consisting essentially of repeating units of the general formulae

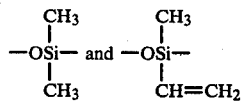

in a molar ratio of from 1:1 to 2:1, respectively; and the concentration of silica particles is from 30 to 40 parts by weight; the organopolysiloxane resin (3) contains at least two vinyl groups per molecule and the molar ratios of (d) units: (e) units: (f) units are within the range 5–10:40–45:45–50, with the proviso that the concentration of (d) units does not exceed about 8%, based on resin weight; the organohydrogen siloxane (4) contains at least 4 silicon-bonded hydrogen atoms per molecule; and the platinum-containing catalyst (5) is a reaction product of chloroplatinic acid and sym-divinyltetramethyl disiloxane.

13. An extrudable composition according to claim 12 wherein in (1) $R^4$, $R^5$ and $R^6$ are methyl; all of the groups represented by $R^1$ and $R^2$ in the organopolysiloxane resin (3) are methyl; the organohydrogen siloxane (4) is a trimethylsiloxy terminated polymethylhydrogensiloxane; and the concentration of platinum-containing catalyst (5) is equivalent to from 5 to 50 parts by weight Pt per million parts of the triorganosiloxy endblocked polydiorganosiloxane.

14. An extrudable composition according to claim 13 where the concentration of vinyl groups present in the organosiloxane groups bonded to the silica particles is from 0.05 to 0.5%, based on the weight of sand particles; the organopolysiloxane resin contains 0.8 mole of trimethylsiloxane units and 0.09 mole $(CH_3)_2CH_2=CH-SiO_{0.5}$ units for each mole of $SiO_{4/2}$ units; and the concentration of the organopolysiloxane resin is from 15 to 30 parts by weight.

15. An extrudable composition according to claim 11 where said extrudable, curable composition contains a platinum catalyst inhibitor in an amount sufficient to inhibit curing of the curable composition at ambient temperature.

16. An extrudable composition according to claim 15 where said platinum catalyst inhibitor is selected from the group consisting of acetylenic alcohols, olefinic siloxanes and polymethylvinylcyclosiloxanes having three to six methylvinylsiloxane units per molecule.

17. An extrudable composition according to claim 16 where said platinum catalyst inhibitor is an acetylenic alcohol.

18. An extrudable composition according to claim 17 where the acetylenic alcohol is 2-methyl-3-butyn-2-ol.

19. An extrudable composition according to claim 11 where the organopolysiloxane exhibits a tear strength greater than 40 kilonewtons/meter and a Shore A durometer hardness greater than 65.

20. An extrudable composition according to claim 11 where the curable composition is post cured at a temperature above 150° C.

* * * * *

UNITED STATES PATENT AND TRADEMARK OFFICE
CERTIFICATE OF CORRECTION

PATENT NO. : 4,427,801            Page 1 of 2

DATED : January 24, 1984

INVENTOR(S) : Randall P. Sweet

It is certified that error appears in the above-identified patent and that said Letters Patent is hereby corrected as shown below:

In column 1, line 65, "99.5" should read -- 99.95 --.

In column 2, line 41, "buffer" should read -- suffer --.

In column 4, lines 30-31 and column 16, lines 27-28, "$SiO\!\!+_x$" should read -- $SiO\!\!\}_x$ --.

In column 4, line 32 and column 6, line 29, "if" should read -- is --.

In column 6, line 6, "Treating" should read -- Treated --.

In column 8, line 66, "the and" should read -- the organopolysiloxane resin and component A and --.

UNITED STATES PATENT AND TRADEMARK OFFICE
CERTIFICATE OF CORRECTION

PATENT NO. : 4,427,801
DATED : January 24, 1984
INVENTOR(S) : Randall P. Sweet

It is certified that error appears in the above-identified patent and that said Letters Patent is hereby corrected as shown below:

In column 11, line 3, "ferom" should read -- from --.

In column 11, line 1, "3,6799,073" should read -- 3,699,073 --.

Signed and Sealed this

Twenty-sixth Day of February 1985

[SEAL]

Attest:

DONALD J. QUIGG

Attesting Officer    Acting Commissioner of Patents and Trademarks